(12) United States Patent
Lysanov et al.

(10) Patent No.: US 11,210,454 B2
(45) Date of Patent: Dec. 28, 2021

(54) METHOD FOR PREPARING DOCUMENTS WRITTEN IN MARKUP LANGUAGES WHILE IMPLEMENTING A USER INTERFACE FOR DEALING WITH DATA OF AN INFORMATION SYSTEM

(71) Applicant: OBSCHESTVO S OGRANICHENNOY OTVETSTVENNOSTYU "INTERSOFT", Moscow (RU)

(72) Inventors: Pavel Urjevich Lysanov, Moscow (RU); Sergey Prokopjevich Kostyuchenkov, Moscow (RU)

(*) Notice: Subject to any disclaimer, the term of this patent is extended or adjusted under 35 U.S.C. 154(b) by 0 days.

(21) Appl. No.: 17/015,019

(22) Filed: Sep. 8, 2020

(65) Prior Publication Data

US 2021/0004523 A1 Jan. 7, 2021

Related U.S. Application Data

(63) Continuation of application No. 16/314,600, filed as application No. PCT/RU2017/000048 on Feb. 1, 2017, now abandoned.

(51) Int. Cl.
*G06F 40/143* (2020.01)
*G06F 16/81* (2019.01)
(Continued)

(52) U.S. Cl.
CPC .......... *G06F 40/143* (2020.01); *G06F 3/0486* (2013.01); *G06F 16/81* (2019.01);
(Continued)

(58) Field of Classification Search
CPC ...... G06F 40/134; G06F 16/81; G06F 16/838; G06F 16/8373; G06F 3/0486
See application file for complete search history.

(56) References Cited

U.S. PATENT DOCUMENTS 5,940,834 A * 8/1999 Pinard .................. G06F 16/972
6,230,161 B1 5/2001 Berkland et al.
(Continued)

OTHER PUBLICATIONS

Written Opinion of the International Search Authority for PCT/RU2017/000048 dated Nov. 23, 2017 and its English translation.
(Continued)

*Primary Examiner* — Asher D Kells
(74) *Attorney, Agent, or Firm* — Anglehart et al.

(57) ABSTRACT

The present technical solution relates to user interfaces in general and more specifically to user interfaces related to dealing with data in computer information systems. A method of preparing documents written in markup languages during implementing a user interface for dealing with data of an information system, wherein: forming metadata for at least one operation; forming a template for representing said operation, the template including at least one document written in at least one markup language; forming and storing a link between the template and at least one operation; displaying the template, forming and storing links between the template elements and operations, wherein selecting a template element and displaying information about operations available for links forming; selecting an operation; forming and storing the link comprising the identifier for the template element selected previously and the identifier for the operation selected previously. The technical result is increasing the efficiency of preparing documents written in markup languages while implementing a user interface for dealing with data of an information system, optimizing time for preparing the documents and simplifying their further maintenance.

17 Claims, 11 Drawing Sheets

(51) Int. Cl.
*G06F 16/838* (2019.01)
*G06F 16/835* (2019.01)
*G06F 3/0486* (2013.01)
*G06F 40/134* (2020.01)

(52) U.S. Cl.
CPC ........ *G06F 16/838* (2019.01); *G06F 16/8373* (2019.01); *G06F 40/134* (2020.01)

(56) References Cited

U.S. PATENT DOCUMENTS

| | | |
|---|---|---|
| 6,262,729 B1 | 7/2001 | Marcos et al. |
| 6,418,448 B1 | 7/2002 | Sarkar |
| 6,964,014 B1 | 11/2005 | Parish |
| 7,421,445 B2 | 9/2008 | O'Neil et al. |
| 7,698,631 B1 | 4/2010 | Toebes |
| 7,707,545 B2 | 4/2010 | Boshier et al. |
| 7,844,644 B2 | 11/2010 | Shin |
| 7,921,137 B2 | 4/2011 | Lieske et al. |
| 8,078,979 B2 | 12/2011 | Howard et al. |
| 8,082,322 B1 | 12/2011 | Pascarella et al. |
| 8,387,006 B1 | 2/2013 | Taylor |
| 8,522,134 B1 | 8/2013 | Zetlen |
| 9,639,517 B2 | 5/2017 | Horiuchi et al. |
| 2002/0073125 A1 | 6/2002 | Bier |
| 2004/0148576 A1 | 7/2004 | Matveyenko et al. |
| 2004/0268231 A1 | 12/2004 | Tunning |
| 2006/0173892 A1 | 8/2006 | Beck |
| 2008/0301628 A1 | 12/2008 | Lochmann |
| 2013/0117731 A1 | 5/2013 | Lesuer et al. |
| 2014/0304682 A1 | 10/2014 | Taylor et al. |
| 2014/0351692 A1 | 11/2014 | Ge |
| 2015/0220649 A1 | 8/2015 | Papa et al. |
| 2015/0317405 A1 | 11/2015 | Manchester |

OTHER PUBLICATIONS

ISR for PCT/RU2017/000048 dated Nov. 23, 2017 and its English translation.
The Web Page as a WYSIWYG End-User Customizable Database-Backed Information Management Application by David R. Karger et all [Publication date—Jan. 1, 2009].
Exhibit: Lightweight Structured Data Publishing by David F. Huynh, David R.Karger, Robert C. Miller [Publication Date—Aug. 5, 2007].
Luo Xiongfei et al: "Synthesis Vis: A Web Site Supporting collaborative Information visualization", Computer Graphics, Imaging and Visualization, 2009, CGIV 09. Sixth International Conference on, Aug. 2009 (Aug. 2009), pp. 443-448, XP055557408, Piscataway, NJ, USA.
Written Opinion of the International Search Authority for PCT/RU2015/000633 dated Jun. 23, 2016 and its English translation.
ISR for PCT/RU2015/000633 dated Jun. 23, 2016 and its English translation.
International Preliminary Report on Patentability Chapter I for PCT/RU2015/000633 dated Apr. 3, 2018.
International Preliminary Report on Patentability Chapter I for PCT/RU2017/000048 dated Aug. 6, 2019.

* cited by examiner

```
<body>
    <div class="c1">
        <div class="c2">
            <div class="c3" style="text-align: right;">
                Name:
            </div>
            <div class="c3">  Name  </div>
        </div>
        <div class="c2">
            <div class="c3" style="text-align: right;">
                Surname:
            </div>
            <div class="c3">  Surname  </div>
        </div>
    </div>
    <hr/>
    <div class="c1">
        <div class="c2">
            <div class="c3-border">Greeting:</div>
            <div class="c3-bold-italic">
                Hello, Name Surname!
            </div>
        </div>
    </div>
</body>
```

```
<!DOCTYPE html>
<html>
 <head>
  <title>example of including lib</title><meta charset="UTF-8">
```

— 122
```
<script type="text/javascript" src="execution_lib"></script>
```

— 123
```
<script type="text/javascript">
                var operation_id = 1 ;
  window.onload = prepare_for_execute;
</script>
```
— 126

```
 </head>
 <body> ... </body>
</html>
```

— 124

```
<!DOCTYPE html>
<html>
 <head>
  <title>example of including lib</title><meta charset="UTF-8">
```

— 125
```
<script type="text/javascript">
    ...
    function prepare_for_execute () {
    ...
    }
    ...
                var operation_id = 1 ;
    window.onload = prepare_for_execute;
</script>
```
— 126

```
 </head>
 <body> ... </body>
</html>
```

Fig. 6

```
var operations_metadata = [{
    "operation_name" : "Write_Hello",
    "path_to_element_to_run" : "5;1;1",
    "event_to_run" : "onclick",
    "input_params" : [
        {"name" : "First_Name", "path" : "1;1;3"},
        {"name" : "Last_Name", "path" : "1;3;3"}
    ],
    "output_params" : [
        {"name" : "Hello_Msg", "path" : "5;1;3"}
    ]
},
...
]
```

127 — "operation_name" : "Write_Hello"
128 — "path_to_element_to_run" : "5;1;1"
129 — "event_to_run" : "onclick"
130 — "input_params" : [
131 — "output_params" : [

```
function get_el_by_path(root_element, path) {
    var indexes = path.split(';');
    var elm = root_element;
    for (var i = 0; i < indexes.length; i++) {
        elm = elm.childNodes.item(parseInt(indexes[i]));
    }
    return elm;
}
```

133

```
function init_template_elements() {
    for (var oi = 0; oi < operations_metadata.length; oi++) {
        for (var pi = 0; pi < operations_metadata[oi].input_params.length; pi++) {
            var input_param = operations_metadata[oi].input_params[pi];
            var element = get_el_by_path(document.body, input_param.path);
            element.textContent = "";
            element.contentEditable = true;
        }
        for (var pi = 0; pi < operations_metadata[oi].output_params.length; pi++) {
            var output_param = operations_metadata[oi].output_params[pi];
            var element = get_el_by_path(document.body, output_param.path);
            element.textContent = "";
        }
    }
}
```

Fig. 8

134
```
function Write_Hello(first_name, last_name) {
    var hello_msg = 'Hello, ' + first_name + ' ' + last_name + '!';
    return [hello_msg];
}
```

135
```
function call_operation(operation_metadata) {
    var params = [];
    for (var pi = 0; pi < operation_metadata.input_params.length; pi++) {
        var input_param = operation_metadata.input_params[pi];
        var element = get_el_by_path(document.body, input_param.path);
        params.push(element.textContent);}
    var result = window[operation_metadata.operation_name].apply(null, params);
    for (var pi = 0; pi < operation_metadata.output_params.length; pi++) {
        var output_param = operation_metadata.output_params[pi];
        var element = get_el_by_path(document.body, output_param.path);
        element.textContent = result[pi];}
}
```

136
```
function init_elements_to_run_operations() {
    for (var oi = 0; oi < operations_metadata.length; oi++) {
        var operation_md = operations_metadata[oi];
        var element = get_el_by_path(document.body,
operation_md.path_to_element_to_run);
        var handler = function () {call_operation(operation_md);};
        element.onclick = function () {handler();}
    }
}
```

Fig. 9

137 — 
| Name: |
| Surname: |
| ─────────── |
| Greeting: |

138 —
| Name: Yuri |
| Surname: Gagarin |
| ─────────── |
| Greeting: |

139 —
| Name: Yuri |
| Surname: Gagarin |
| ─────────── |
| Greeting: *Hello, Yuri Gagarin!* |

Fig. 10

METHOD FOR PREPARING DOCUMENTS WRITTEN IN MARKUP LANGUAGES WHILE IMPLEMENTING A USER INTERFACE FOR DEALING WITH DATA OF AN INFORMATION SYSTEM

FIELD OF THE INVENTION

The present technical solution generally relates to user interfaces, and more specifically to user interfaces intended for dealing with data in computer information systems.

BACKGROUND OF THE INVENTION

To process data, the users of computer information systems typically initiate execution of operations that may have input and output parameters. Nowadays, markup languages, including, but not limited to, HTML and XML, are widely used in computer information systems, said markup languages being used for storing, transmitting, publishing, and other data handling tasks including, inter alia, implementing a user interface to initiate execution of operations, wherein, arguably, the most popular methods are ones where elements for representing the values of input and output parameters of operations and elements for initiating execution of operations are included in documents written in markup languages and provided to a user for processing in a browser. The user can enter and edit the values of input parameters of operations, initiate execution of operations and observe the values of output parameters of operations. It should be noted that documents written in markup languages, apart from the elements for representing the values of parameters of operations and the elements for initiating execution of operations themselves, comprise auxiliary elements, said auxiliary elements determining styles and/or a location for displaying of the values of parameters of operations in the browser. Moreover, such documents may comprise design elements (for example, background images), auxiliary textual fragments (for example, descriptive notes) and other elements not related to the operations or operation parameters. To provide a user with a possibility to enter or edit the values of input parameters of operations, initiate execution of operations and observe the values of output parameters of operations using the browser, it is necessary to ensure the availability, in documents written in a markup language, of elements intended for representing the values of input and output parameters of operations, and elements intended for initiating execution of operations.

Prior art provides a method where special elements intended for initiating execution of operations (for example, the FORM element in HTML) are inserted into documents written in markup languages, said elements comprising an operation name indicated as the value of an attribute that includes an operation program address; and also inserted are special elements for representing the values of parameters of an operation (for example, the INPUT elements in HTML). This method requires additional specific knowledge that includes at least the knowledge of syntax of a markup language used to form special elements which are inserted into documents. This method also requires dealing with the source code of documents written in markup languages.

Prior art provides another method where special symbols and variables associated with said special symbols are inserted into locations, intended for placement of elements representing parameters of operations and elements for initiating, by the user, execution of operations, within documents written in markup languages; said special symbols and variables being replaced with metadata of operations/their parameters during the process of preparing to transmit the documents to the browser. Processing of such documents, also known as "templates", is performed via so called template processors, for example, by ApacheVelocity. This method requires additional specific knowledge that includes at least the syntax of a template processor. Moreover, this method is time consuming due to the process of inserting, into documents written in markup languages, the special symbols and variables, and their periodic update in cases of changes in the syntax of a template processor or development thereof.

SUMMARY OF THE TECHNICAL SOLUTION

Below is a simplified description of the technical solution as an aid to understanding its certain aspects. This summary is not an extensive overview. It is not intended to identify key or critical elements of the present technical solution. Its sole purpose is to present certain aspects in a simplified form, as a prelude to the more detailed description of the technical solution that follows.

It is an object of the present technical solution to ameliorate the disadvantages of prior art.

The technical result is to improve the efficiency of preparing documents written in markup languages during implementing a user interface for dealing with data of an information system.

A further technical result being achieved herein is optimizing time for preparing documents written in markup languages, and simplifying further maintenance of the documents.

The technical effect is achieved by means of elimination of the need for inserting additional information into documents written in markup languages, the additional information being intended to manage the representation of parameters of operations, and to manage actions towards initiating, by the user, execution of operations, thereby eliminating the user's need to deal with the source code of a document written in a markup language.

Said technical result is achieved by means of applying the method of preparing documents written in markup languages during implementing a user interface for dealing with data of an information system, wherein metadata is formed for at least one operation; a template for representing said operation is formed, said template consisting of at least one document written in at least one markup language; a link between the template and at least one operation is formed and saved; the template is displayed, the links between the template elements and operations are formed and saved, wherein a template element is selected and information about operations available for link forming is displayed; an operation is selected; a link comprising the identifier of a previously selected template element and the identifier of a previously selected operation is formed and saved.

In some embodiments, the markup language is HTML, or XML, or XHTML, or DocBook.

In some embodiments, a template is formed using text editors with syntax highlighting, or WYSIWYG editors, or online editors.

In some embodiments, the formed template is saved to a server in a database.

In some embodiments, information about the formed link between a template and operation is saved to a server in a database.

In some embodiments, within the information about the formed link between a template and operation, the identifier of a template type and the identifier of a user language, said language being used to form the values of auxiliary elements of a template, are further saved.

In some embodiments, prior to displaying a template, the server retrieves the template from a database and inserts, the following elements into the template: an element comprising operations identifiers, using information about the link between the template and operations; and an element enabling a program code library, the program code intended to form and store links between the template elements and operations, operations input and output parameters.

In some embodiments, the program code library is implemented in a programming language supported by the browser.

In some embodiments, the programming language supported by the browser is JavaScript or Dart.

In some embodiments, the program code library is located on a remote server accessed via the Internet.

In some embodiments, prior to displaying a template, the server retrieves the template from the database and inserts, into the template, the following elements: an element comprising operations identifiers, using information about the link between the template and operations; and an element comprising a program code, the code intended to form and save links between the template elements and operations, operations input and output parameters.

In some embodiments, for purposes of selecting a template element, the element becomes graphically marked at a time when a user locates a pointer on the template element.

In some embodiments, information about operations, operations input and output parameters, available for forming links is displayed as lists, said lists including only available operations, operations input and output parameters, that are not yet linked to any template element.

In some embodiments, information about operations, operations input and output parameters available for forming links is displayed in a separate browser window or in a movable area within a window displaying a template, wherein the links to the template elements are formed by employing the Drag-and-Drop technique.

In some embodiments, after forming the link between a template element and an operation, or its input or output parameter, this element becomes graphically marked.

In some embodiments, a sequence of child elements indexes is used as the identifier of a template element, the sequence of child elements indexes leads to an element from a known template element.

In some embodiments, the value of the ID attribute is used as the identifier of a template element.

In some embodiments, the values of the ID attribute, which are unique for a template, are established for all template elements automatically after forming a link between the template and operation.

In some embodiments, the value of the ID attribute, which is unique for a template, is established for the template element automatically during forming a link between this element and operations, or input or output parameters of the operations.

In some embodiments, an expression for a request, said expression being written in the XPath language is used as the identifier of a template element.

In some embodiments, the unique template value of an element is used as the identifier of a template element.

In some embodiments, to retrieve the identifiers of template elements, the XPath language is used.

In some embodiments, forming and saving a link between an operation/input or output parameter of an operation and selected template element, using a control element displayed along with the lists of operations, operations input and output parameters available for forming the link are initiated.

In some embodiments, the formed links between template elements and operations, operations input and output parameters are saved to a server in a database.

DESCRIPTION OF THE DRAWINGS

The following description and the accompanying drawings formulate illustrative aspects of the technical solution in more detail. However, these aspects show only some of various methods of some embodiments of the given technical solution. Features and advantages of the present technical solution will become apparent from the following detailed description and the accompanying drawings, where.

Figure 1:
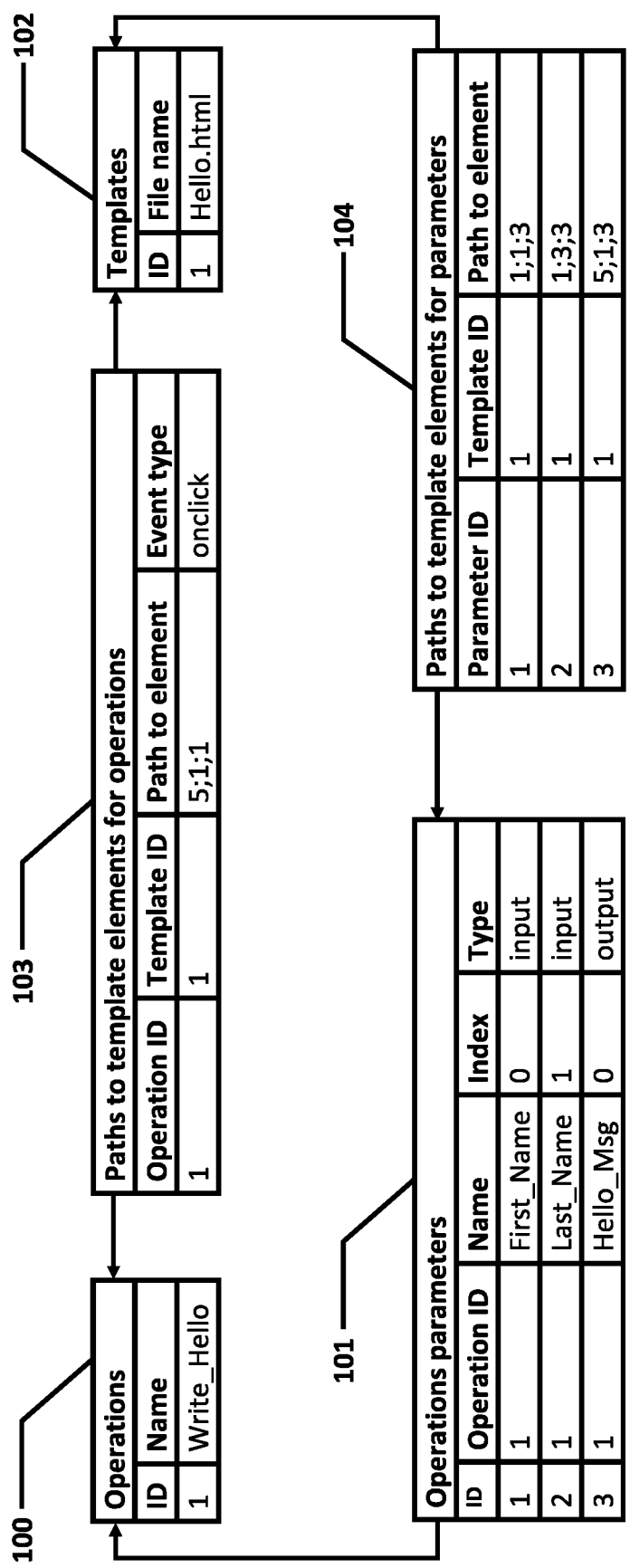
FIG. 1 depicts a fragment of a possible database structure with an indication of the tables attributes, the approximate content of tables and links between the tables (as arrows), there are indicated.

table 100 of operations wherein operations metadata is stored;

table 101 of operations parameters wherein the metadata of operations parameters is stored; a link between an operation parameter from table 101 and an operation from table 100 is provided by storing the value of the operation identifier within the metadata of the operation parameter (in the "Operation ID" attribute in table 101);

table 102 of templates for representing operations wherein templates metadata is stored;

table 103 with paths to the elements of templates for operations, wherein paths to target elements from root elements of templates (as strings including digital representations of numerical values of child elements indexes placed from left to right and separated by a semicolon symbol), and event types for template elements, upon said event types execution of operations is initiated, are stored; a link between a path from table 103 and a template from table 102 is provided by storing the value of a template identifier within table 103 (in the "Template ID" attribute in the table 103); a link between a path from table 103 and an operation from table 100 is provided by storing the value of an operation identifier within table 103 (in the "Operation ID" attribute in table 103).

table 104 with paths to the elements of templates for parameters of operations, wherein paths to target elements from the root elements of templates (as strings including digital representations of numerical values of child elements indexes placed from left to right and separated by a semicolon symbol) are stored; a link between a path from table 104 and a template from table 102 is provided by storing the value of a template identifier within table 104 (in the "Template ID" attribute in table 104); a link between a path from table 104 and an operation parameter from table 101 is provided by storing the value of the identifier of an operation parameter within table 104 (in the "Parameter ID" attribute in table 104).

FIG. 2 depicts an abridged fragment of one of possible variants of a template written in HTML, in the fragment there are indicated:

auxiliary element 105 of the "horizontal line" type;

auxiliary label 106;

element 107 of the template for representing the value of "First_Name" input parameter of "Write_Hello" operation, and template value 108 of this element;

element 109 of the template for representing the value of "Hello_Msg" output parameter of "Write_Hello" operation, and template value 110 of this element;

element 111 of the template for initiating, by the user, execution of "Write_Hello" operation.

Figure 3:
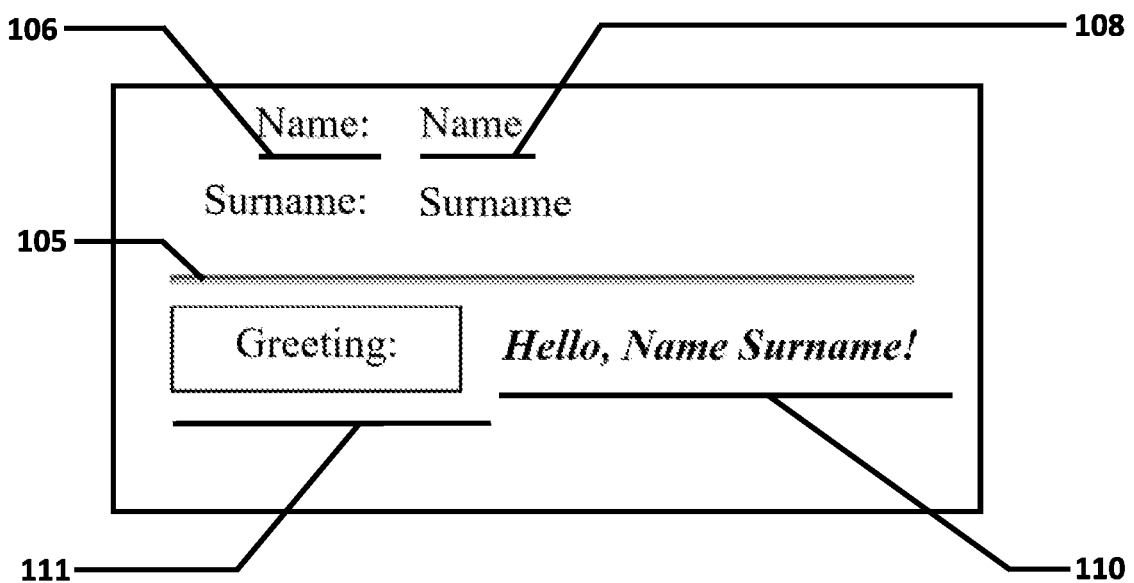

FIG. 3 depicts a visual representation, by the browser, of the abridged fragment of one of possible variants of the template written in HTML, the fragment depicted in FIG. 2, there are indicated:

auxiliary element 105;

auxiliary label 106;

template values 108 and 110;

element 111 of the template for initiating, by the user, execution of the operation.

Figure 4:
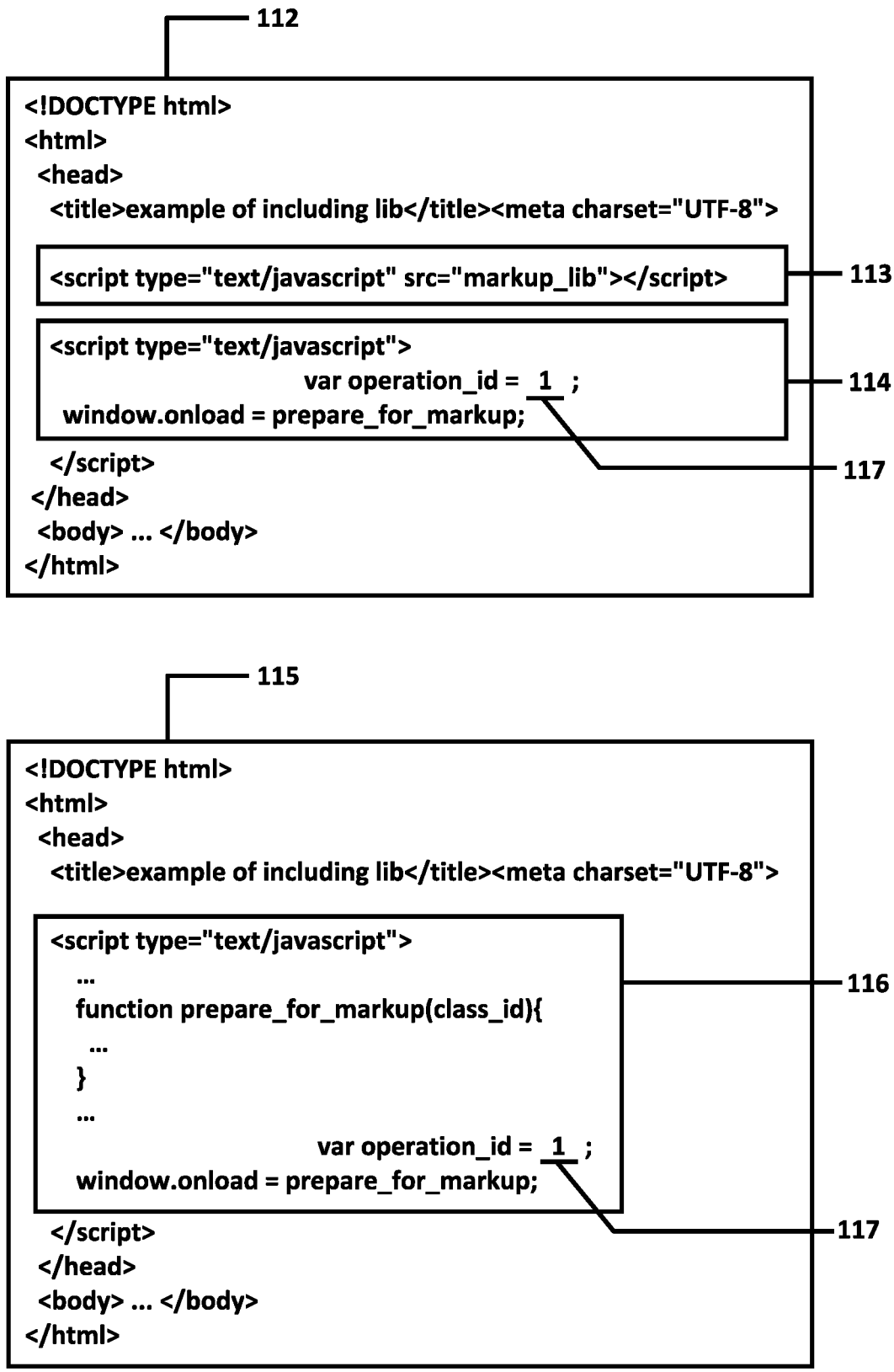

FIG. 4 depicts examples of possible variants of inserting, into a template, an element for enabling a program code library, the program code provides forming and storing links between the template elements and an operation, its input and output parameters, and an element with the operation identifier, the operation linked to the template (in case the template is formed in HTML and the program code of the library is formed in the JavaScript language). In FIG. 4 there are indicated:

example 112 of a simplified template for operation representation in HTML with element 113 inserted by the server, element 113 enables the program code library located in an external file named "markup_lib"; element 114 inserted into the template by the server, element 114, after finishing loading the template by the browser, provides the "prepare_for_markup" procedure call for preparing the template for forming and storing links between the template elements and the operation, its input and output parameters;

example 115 of a simplified template for operation representation in HTML with element 116 inserted by the server, element 116 includes the program code of the library itself and, after finishing loading the template by the browser, provides the "prepare_for_markup" procedure call for preparing the template for forming and storing links between template elements and the operation, its input and output parameters;

operation identifier 117, the operation for which links between template elements and the operation, its input and output parameters will be formed and stored.

Figure 5:
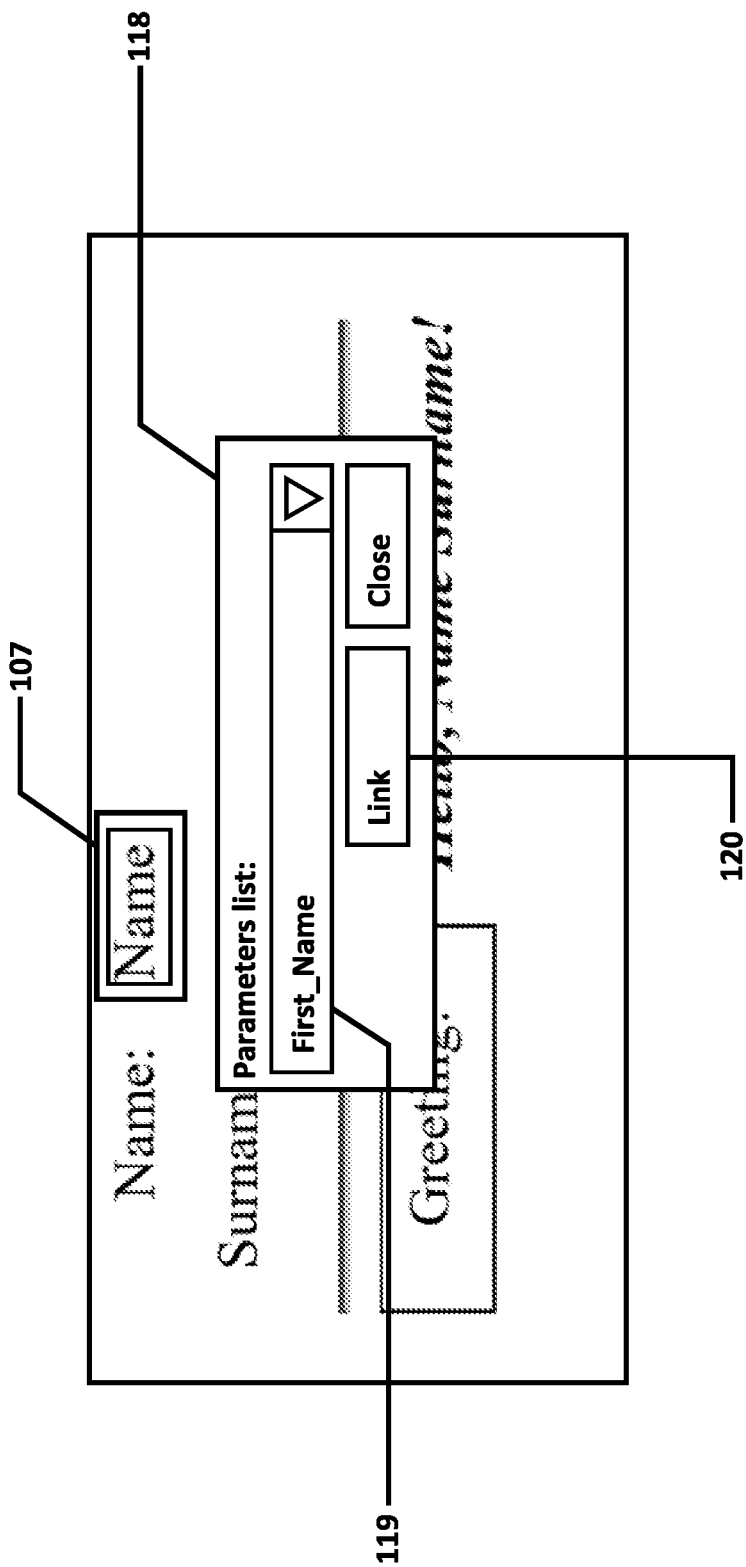

FIG. 5 depicts a visual representation, by the browser, of the abridged fragment of one of possible variants of a template written in HTML, the fragment depicted in FIG. 2, in mode of forming and storing links between the elements and the operation, its input and output parameters. In FIG. 5 there are indicated:

element 107 selected and marked graphically (by a solid line frame);

dialog window 118, the window includes list 119 of operation parameters available for forming links; button 120 intended for starting the procedure of forming and storing links.

FIG. 6 depicts examples of possible variants of inserting, into a template, an element for enabling a program code library, the program code provides entering the values of input parameters of an operation, initiating execution of the operation, and representing, in the template, the values of output parameters of the operation (in case the template is formed in HTML, and the program code of the library is formed in the JavaScript language). In FIG. 6 there are indicated:

example 121 of a simplified template for operation representation in HTML with element 122 inserted by the server, element 122 enables the program code library located in an external file named "execution_lib";

element 123 inserted into the template by the server, element 123, after finishing loading the template by the browser, provides the "prepare_for_execute" procedure call for preparing the elements of the template for entering the values of input parameters of the operation, initiating execution of the operation and representing, in the template, the values of output parameters of the operation; example 124 of a simplified template for operation representation in HTML with element 125 inserted by the server, element 125 includes the program code of the library itself and, after finishing loading the template by the browser, provides the "prepare_for_execute" procedure call for preparing the elements of the template for user's actions comprising entering the values of input parameters of the operation, initiating execution of the operation and representing, in the template, the values of output parameters of the operation;

operation identifier 126.

FIG. 7 depicts an abridged example of an object (as a program code written in the JavaScript language for the object generation) for storing, in the browser memory, the metadata of operations and operations input and output parameters, wherein there are indicated:

property 127 wherein the name of the operation is stored;

property 128 wherein the path to the element of the template that is used for initiating execution of the operation is stored;

property 129 wherein the event type, said event to be called for the element that is used for initiating execution of the operation, is stored;

array 130 of input parameters of the operation, the elements of said array 130 comprise names of parameters and paths from the root element of the template to target elements of the template for representing the values of input parameters of the operation;

array 131 of output parameters of the operation, the elements of said array 131 comprise names of parameters and paths from the root element of the template to target elements of the template for representing the values of output parameters of the operation;

FIG. 8 depicts examples of the functions of a program code library, the program code provides entering the values of input parameters of an operation, initiating execution of the operation, and representing, in the template, the values of output parameters of the operation (in case the template is formed in HTML, and the program code of the library is formed in the JavaScript language). In FIG. 8 there are indicated:

auxiliary function 132 that takes a DOM root element and a path (from this root element) as parameters and returns the DOM element found following the path in correspondence with the root element;

function 133 of initiation of the values of template elements representing input and output parameters of the operation;

FIG. 9 depicts examples of the functions of a program code library, the program code provides entering the values of input parameters of an operation, initiating execution of the operation, and representing, in the template, the values of output parameters of the operation (in case the template is formed in HTML, and the program code of the library is formed in the JavaScript language). In FIG. 9 there are indicated:

example 134 of a function, which receives the values of "First_Name" and "Last_Name" input parameters, and returns a greeting text as the value of "Hello_Msg" output parameter.

function 135 of the operation execution call, with transfer of the values of input parameters, and with placement of the values of output parameters;

function 136 of assigning an event handler for the element of the template intended for initiating execution of the operation.

In FIG. 10 there are depicted:

visual representation 137 by the browser, of an example of a template, after preparing the elements of the template for entering the values of input parameters of an operation, initiating execution of the operation, and representing, in the template, the values of output parameters of the operation; visual representation 138, by the browser, of the example of the template, with entered values of "First_Name" and "Last_Name" input parameters of "Write_Hello" operation.

visual representation 139, by the browser, of an example of a template, with the value of "Hello_Msg" output parameter, said value placed in the template, after initiating execution of "Write_Hello" operation.

Figure 11:
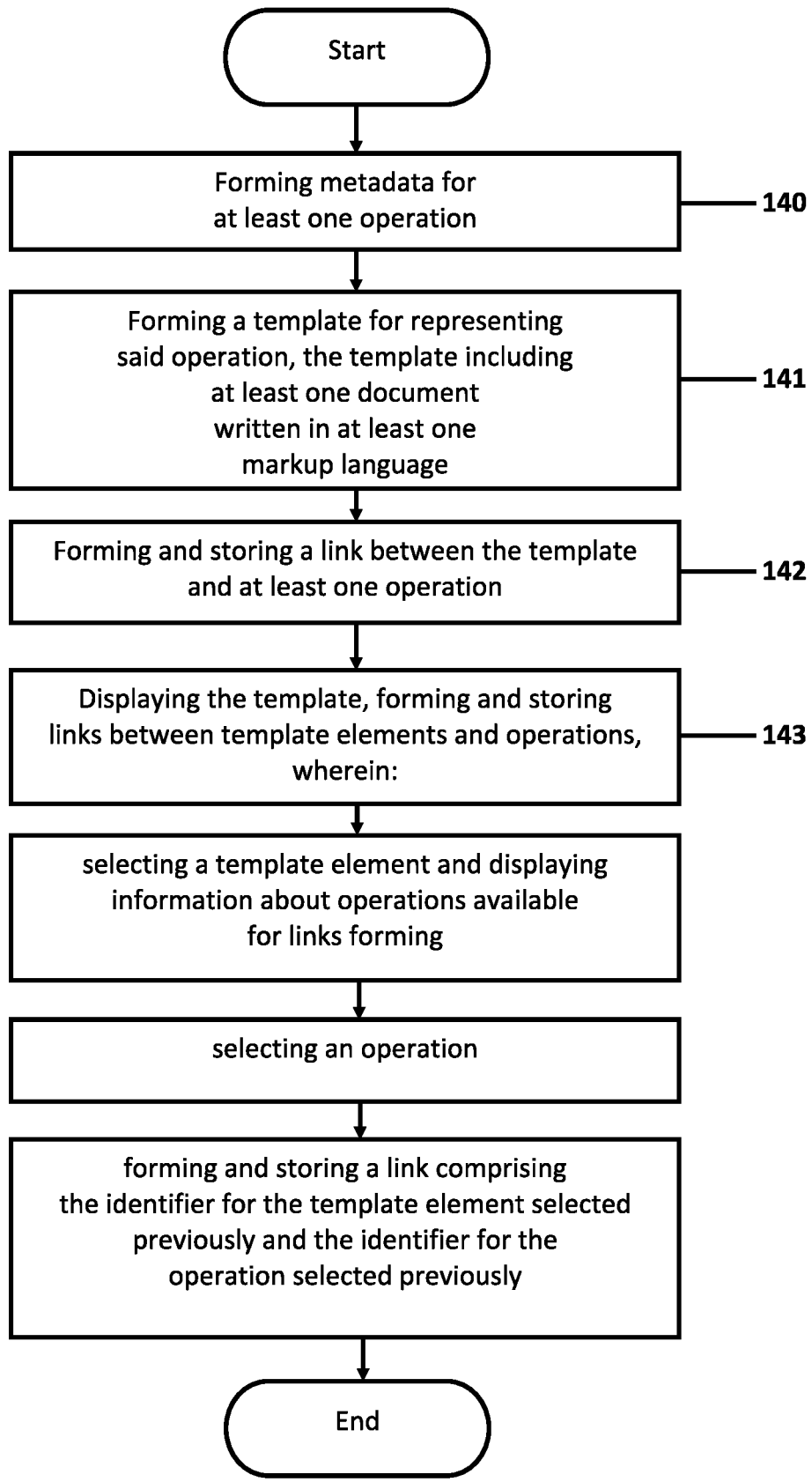

FIG. 11 depicts a block diagram showing an implementation variant of the method for preparing documents written in markup languages while implementing a user interface for dealing with data of an information system.

DETAILED DESCRIPTION OF THE TECHNICAL SOLUTION

Exemplary terms and denominations provided herein are intended to be only illustrative examples of the present technical solution and are not intended to identify key or critical elements of the present technical solution; also they are not intended to influence the scope of protection, which is determined solely by the claims of the technical solution.

Merely for the purposes of ease of illustration, HTML is used herein as an example, however, as a person skilled in the art would appreciate, the present method can be implemented using any other markup language which can be supported by browsers, and which provides a possibility of hierarchic structure of markup elements and data within a document written in this language. Such languages may be, for example, some applications and the subsets of the SGML metalanguage.

The present technical solution may be implemented on a computer and as a computer system or a storage media containing instructions for implementing said method.

The present technical solution may be implemented in a distributed computer system.

Below are the terms and their definitions necessary for understanding the present technical solution.

Data is reinterpretable representation of information in a formalized manner suitable for communication, interpretation, or processing (ISO/IEC 2382:2015, 2121272 "data");

Data element is a unit of data that is considered in context to be indivisible (ISO/IEC 2382:2015, 2121599 ("data element");

Database (DB) is a collection of data organized according to a conceptual structure describing the characteristics of these data and the relationships among their corresponding entities, supporting one or more application areas (ISO/IEC 2382:2015, U.S. Pat. No. 2,121,413 "database");

Metadata is data about data or data elements, possibly including their data descriptions, and data about data ownership, access paths, access rights and data volatility (ISO/IEC 2382:2015, U.S. Pat. No. 2,121,505 "metadata");

Server is a functional unit that provides services to workstations, to personal computers or to other functional units in a computer network (ISO/IEC 2382:2015, U.S. Pat. No. 2,120,558 "server"); functional unit that provides shared services to workstations or to other functional units over a data network (ISO/IEC 2382:2015, U.S. Pat. No. 2,124,462 "server");

Web browser is an application program software for browsing web pages; in the context of the present specification, unless expressly provided otherwise, the web browser is intended to mean any software providing to a user an interface for dealing with documents written in markup languages and the ability to implement program code written in script languages such as, for example, but without being limitative, JavaScript or Dart;

XPath (XML Path Language) is a language for addressing parts of an XML document, designed to be used by both XSLT and XPointer (http://www.w3.org/TR/1999/REC-xpath-19991116/);

SGML (Standard Generalized Markup Language) is a metalanguage that allows defining a markup language for documents (ISO 8879:1986, "Standard Generalized Markup Language");

Entity is any concrete or abstract thing that exists, did exist, or might exist, including associations among these things (ISO/IEC 2382:2015, U.S. Pat. No. 2,121,433 "entity");

Attribute is a named property of an entity (ISO/IEC 2382:2015, 2121440 "attribute");

Entity class is a set of entities with a common attributes (ISO/IEC 2382:2015, U.S. Pat. No. 2,121,438 "entity class");

Entity occurrence (entity class occurrence) is a specific entity of a given entity class (ISO/IEC 2382:2015, U.S. Pat. No. 2,121,439 "entity occurrence"); Attribute value is a specific occurrence of an attribute (ISO/IEC 2382:2015, 2121441 "attribute value");

Operation is an action or a combination of actions on data and/or metadata, which result in: the change in at least one element of data or metadata, or the creation or deletion of at least one element of data or metadata, or the formation of at least one resulting value.

Parameter (of an operation) is any value supplied to the input of an operation, said value influencing the result of an operation (input parameter) or being formed as a result of an operation (output parameter).

Template (of representation of an operation) is a document written in a markup language, said document may be located on a storage medium, that can be used while implementing a user interface for dealing with one or several operations;

Template element is the smallest indivisible structure template element (for example, an HTML tag);

Template type is a metadata element of a template, the template type indicates intended use of a template, for example, "for touch screen devices", "for the physically challenged" etc.; templates of different types can be different in structure and appearance; templates intended to represent entities in different user languages can also be different in structure and appearance; DOM (Document Object Model) is a platform- and language-neutral interface that will allow programs and scripts to dynamically access and update the content, structure and style of documents (http://www.w3.org/DOM/);

AJAX (Asynchronous Javascript and XML) is a concept of building user interfaces of web-applications, the concept is a "background" data communication between a browser and a web-server. As a result, during data refreshing a web-page is not fully downloaded and web-applications become faster and more convenient.

Drag-and-Drop is a method of operating interface elements in user interfaces using a mouse manipulator or another pointer;

Distributed computer system is a set of independent computers (computer devices) regarded by their users as a single combined system; Command processing device is an electronic block or an integrated circuit (microprocessor) executing computer instructions (programs).

Command processing device reads and executes computer instructions (programs) from one or more data storage devices. Data storage devices are, for example, but without being limitative, HDD, flash memory, ROM, SSD.

Program is a sequence of instructions intended to be executed by a control device of a computer or a command processing device.

According to an embodiment of the method of preparing documents written in markup languages during implementing a user interface for dealing with data of an information system (FIG. 11):

Step 140: forming metadata for at least one operation;

In exemplary embodiments, an operation comprises at least one parameter that can be an input parameter or an output parameter.

In exemplary embodiments, an operation parameter may be an entity occurrence identifier that may be transferred to, for example, an operation of deletion of an entity occurrence from the database. In other cases, for example, several values entered by the user are transferred, as parameters, to the operation of creation of an entity occurrence, and, when creating the entity occurrence, are saved to the database as the values of attributes of an entity occurrence.

The metadata of operations is formed by initiating metadata elements using traditional tools intended for dealing with dictionaries, said tools being known from the prior art, wherein, for example, such metadata elements as "operation identifier", "operation name", "operation description", a set of "input parameters", a set of "output parameters", and "operation program" that, when executed, will, in fact, be employed to achieve objectives of the operation, are initiated and saved to the server and/or database.

Operations store data only for the period of execution, whereas entity class occurrences are typically intended for long-term storage of data.

Step 141: forming a template for representing said operation, the template including at least one document written in at least one markup language; In some embodiments, the markup language, for example, but without being limitative, HTML, or XML, or XHTML, or DocBook, is used to form an operation template.

In some embodiments, documents written in markup languages are formed using software suitable for the markup languages used including, but without being limitative, text editors with syntax highlighting, or WYSIWYG editors including online editors.

In templates for representation of operations, elements, which will represent the values of input/output parameters of operations, elements intended for initiation, by the user, of execution of operations, and auxiliary elements are generated including (without being limitative) descriptive notes, background images, dividing lines and other elements.

In some embodiments, the values of template elements, the template elements are intended to present values of operation parameters, are established using data types/sizes corresponding to the operation parameters.

In some embodiments, the formed template is saved to a server in a database.

Step 142: forming and storing a link between the template and at least one operation;

In some embodiments, the link between a template and operation is formed by virtue of selecting an operation from a received, from the server, set of operations and selecting a template (including, but not limited to: a file, WYSIWYG editor), thereby providing a link between the operation and template.

In some embodiments, the information about the formed link is saved to a server in a database. FIG. 1 illustrates one of possible variants of storing a link between a template and operation: the link between a template from the table 102 and an operation from the table 100 is provided by storing the values of operation identifiers and template identifiers within the table 103 of paths to the elements of templates for operations, in the "Operation ID" and "Template ID" attributes, respectively.

In some embodiments, within the information about the formed link between a template and operation, a template type identifier (for example, an identifier indicating the purpose of a template type: "for touch screen devices", "for the physically challenged" etc. and a user language identifier are further saved, said language being used for forming values of auxiliary elements of the template (for example, text descriptions or images containing text).

Step 143: displaying the template, forming and storing links between template elements and operations, wherein:

selecting a template element and displaying information about operations available for links forming; selecting an operation; forming and storing a link comprising the identifier for the template element selected previously and the identifier for the operation selected previously.

The links between template elements and operations may be formed in the browser, thus allowing remote work, for example using the Internet.

In some embodiments, to retrieve the template for forming and storing links between template elements and operations, operations input and output parameters, retrieving of the template in the browser is initiated, the browser requests the template from the server. The server retrieves the template from the database and inserts, into the template, an element enabling a program code library, the code intended to form and store links between template elements and operations, operations input/output parameters, the server also inserts, into the template, an element comprising operations identifiers, using information about the links between the template and operations, links formed and stored to the database in the previous step; the server then sends the template to the browser for displaying. FIG. 4 depicts example 112 of the simplified template for operation representation with element 113 inserted by the server, the element enables the program code library located in the external file named "markup_lib", and with element 114 inserted by the server, element 114 includes operation identifier 117.

In some embodiments, the server retrieves a template from the database and inserts, into the template, an element comprising a program code, the code intended to form and store links between the template elements and operations, operations input/output parameters, and the operations identifiers using information about the links between the template and operations, links formed and stored to the database in the previous step; the server then sends the template to the browser for displaying. FIG. 4 depicts example 115 of the simplified template for operation representation with element 116 inserted by the server, element 116 comprises a program code and operation identifier 117.

In some embodiments, a program code intended to provide the user with an opportunity to form and store links between template elements and operations, operations input/output parameters, is implemented in any programming language supported by the browser such as, for example, but without being limitative, JavaScript or Dart.

In some embodiments, a program code library intended for forming and storing links between template elements and operations, operations input and output parameters, is located on a remote server accessed via the Internet.

In some embodiments, when the cursor (or any other pointer) is placed on a template element, this element is marked graphically for ease of selecting the element for forming a link between the element and an operation, its input/output parameter.

In some embodiments, when a template element is selected, the information about operations, operations input and output parameters, available for forming links, said information being received from a remote server, is displayed. FIG. 5 depicts a visual representation, by the browser, of the abridged fragment of one of possible variants of a template written in HTML, the fragment depicted in FIG. 2, in mode of forming links between template elements and operations, operations input and output parameters.

In some embodiments of the technical solution, the information about operations, operations input and output parameters, available for forming links is displayed as lists, the lists include only available operations, operations input and output parameters, that are not yet linked to any template element.

In some embodiments of the technical solution, the information about operations, operations input and output parameters, available for forming links, is displayed in a separate browser window or in a movable area within a window displaying the template, wherein forming links to the template elements is effected using the Drag-and-Drop technique.

In some embodiments, an operation, its input and output parameters are selected, thereby forming and storing a link to a previously selected template element.

In some embodiments, an operation, its input and output parameters are selected, and then the formation and storing of a link to a previously selected template element, using a control element, for example, a button displayed along with lists of operations, operations input and output parameters available for forming a link, are initiated. FIG. 5 depicts button 120, button 120 intended for starting the procedure of forming and storing the link between "First_Name" parameter selected in list 119 and previously selected template element 107.

In some embodiments, information about the formed and stored link includes an operation identifier, or an identifier of an input/output parameter of an operation, and an identifier of a template element. "Identifier of a template element» is intended to mean any information allowing the program code implemented by the browser to access the given template element.

To deal with a document written in a markup language the browser builds, in the memory, an internal representation of the document and provides the program code implemented by the browser with the access to said representation as DOM; to effect that the browser reproduces in the memory the document tag hierarchy. In DOM, each element, except for the root element, has its single direct "parent" (a higher level element); a link to the parent element is stored within the element itself (parentNode for HTML and JavaScript), and all elements may have several "children" (lower level elements) and in this case each such element has a special array of links to child elements (childNodes for HTML and JavaScript). Each link in the array has a sequential number (index). Thus, for each template element, by iteratively referring to direct "parents", a unique sequence of child element indexes can be determined, the sequence goes from the root element (or another known element) to the given element. In the context of the present application, in some cases, to abbreviate, this sequence will be referred to as "a path" (to an element).

In some embodiments, in case of using templates written in HTML, the BODY element is used as a root element.

In some embodiments, while forming a link between a template element and operation, or its input or output parameter, a path from the DOM root element to the template element is used as the identifier of the template element.

In some embodiments, the value of the ID attribute of a given template element is used as the identifier of the template element.

In some embodiments, the values of the ID attribute, which are unique for a template, are established for all template elements automatically after forming a link between the template and operation.

In some embodiments, the value of the ID attribute, said value being unique for a template, is established for a template element automatically during forming a link between this element and an operation/its input or output parameter.

In some embodiments, an expression for a request, the expression written in XPath request language is used as the identifier of a template element.

In some embodiments, the unique value of an element is used as the identifier of a template element.

In some embodiments, to retrieve the identifiers of template elements, the XPath language is used.

In some embodiments, after forming a link between a template element and operation, or its input or output parameter, this element becomes graphically marked.

In some embodiments, the formed links between the template elements and operations, operations input and output parameters are stored to a server in a database.

In some embodiments, paths to template elements are stored as strings including digital representations of numerical values of indexes placed from left to right or from right to left and separated by a special symbol or a group of symbols. Thus, in table 104 depicted in FIG. 1, the path to element 107 depicted in FIG. 2 from the BODY element is saved as the "1;1;3" string. In table 104 depicted in FIG. 1, the path to element 109 depicted in FIG. 2 from the BODY element is saved as the "5;1;3" string. In table 103 depicted in FIG. 1, the path to element 111 depicted in FIG. 2 from the BODY element is saved as the "5;1;1" string.

As a person skilled in the art would understand, any known database type can be used as a database. For example, it may be hierarchical, network, SQL and object-oriented databases.

The results of the method for preparing documents written in markup languages while implementing a user interface for dealing with data of an information system may be used (without being limitative) as follows:

obtaining a template for representing an operation;

A request to the server to perform an operation is initiated in the browser. The browser sends the identifier of the operation within the request. Using the identifier of the operation, the server refers to the database and retrieves, from table 103, the identifier of the template for representing the operation, and then retrieves, from table 104, the template file name. The server inserts, into the template, an element enabling a program code library, the library provides receiving, by the browser, (in the next step of the method) necessary metadata of the operation, its input and output parameters; preparing the elements of the template for execution of the operation, and also providing entering the values of input parameters of the operation, initiating execution of the operation, and placing, in the template, the values of output parameters of the operation; the server further inserts, into the template, an element comprising the identifier of the operation; the server then sends the template to the browser for displaying. FIG. 6 depicts example 121 of a variant of inserting, into the template, an element for enabling a program code library and inserting the identifier of an operation, in case the library is located in an external file.

In some embodiments, the server inserts, into the template, the program code of a library. FIG. 6 depicts example 124 of a variant of inserting, into the template, an element for enabling a program code library and inserting the identifier of an operation, in case the server inserts into the template the program code of the library. The library may be implemented in any programming language supported by the browser, including (but without being limitative) JavaScript or Dart.

In some embodiments, the external library may be located on a remote server accessed via the Internet.

obtaining the metadata of operations and their input and output parameters, including information about links between operations/their input and output parameters and template elements;

In some embodiments, the metadata of operations is obtained using AJAX. Possible database structure and exemplary possible compositions of the metadata of operations and their input and output parameters are depicted in FIG. 1.

In some embodiments, the data and metadata received from the database are stored in the browser memory within the object; the program code of the library enabled in the previous step refers to that object. FIG. 7 depicts an example of an object (as a program code written in the JavaScript language for object generation) for storing, in the browser memory, the metadata of an operation, including information about links between the operation/its input and output parameters and template elements. The composition of metadata within an exemplary object depicted in FIG. 7 is fully corresponding to the exemplary possible composition of metadata depicted in FIG. 1.

displaying a template;

In some embodiments, the program code of the library enabled previously uses an object placed into the browser memory in the previous step, the object has the metadata of an operation, its input and output parameters to initiate the corresponding template elements. For example, function 133 depicted in FIG. 8 first refers to array 130 of objects in a loop fashion (the objects comprising the names of input parameters of the operation and paths to the elements of the template for representing values of input parameters of the operation) and, using auxiliary function 132, finds the template elements and then replaces the template values of the elements with a space, and further establishes the value TRUE of the attribute CONTENTEDITABLE for these elements; function 133 refers then to array 131 of objects in a loop fashion (the objects comprising the names of output parameters of the operation and paths to the elements of the template for representing the values of output parameters of the operation) and, using auxiliary function 132, finds template elements and then deletes the template values of the elements; function 136 depicted in FIG. 9, using a path included in property 128, finds a template element intended for initiating execution of the operation, and assigns, to the template element, the operation indicated in property 127, said operation used as the handler of an event indicated in property 129. FIG. 10 depicts visual representation 137, by the browser, of an exemplary template after preparing the elements of the template for entering the values of input parameters of the operation, initiating execution of the operation and representing, in the template, the values of output parameters of the operation, said visual representation corresponding to the exemplary object in the browser memory depicted in FIG. 7 and to the exemplary possible composition of metadata depicted in FIG. 1.

In some embodiments, paths to template elements are used only for the primary search. Then, temporary synthetic identifiers (using the ID attribute) are assigned to these elements to shorten the time of referring to the elements due to using the possibility of element search using a value of the ID attribute; such possibility is provided by DOM.

entering the values of input parameters of an operation;

The entry of the values of input parameters of an operation consists in changing the values of elements of the template of the operation, in the representation of the template in the browser. FIG. 13 depicts visual representation 138, by the browser, of the exemplary template after entering the values of input parameters of the operation.

In some embodiments, in case of using templates written in HTML, a possibility to change the values of the parameters of the operation in the WYSIWYG mode is used, for that purpose, the program code of the previously enabled library further establishes the value TRUE of the attribute CONTENTEDITABLE for corresponding template elements.

In some embodiments, the values of the input parameters of the operation are entered using a dialog window, the window appears upon selecting a corresponding template element.

In some embodiments, to ease the entry of the values of input parameters of operations, the template elements that comprise values available for entry are marked graphically.

In some embodiments, to ease the entry of the values of input parameters of operations, the template elements that comprise values that have already been entered are marked graphically;

initiating execution of an operation.

Execution of an operation is initiated by an action towards a template element, said action resulting in an event, within the context of said element, said event being handled by a previously assigned operation call. For example, according to the exemplary object in the browser memory depicted in FIG. 7, execution of the operation is initiated by way of pressing a pointer's button, e.g. a mouse, touching an element on a touch screen, or in another fashion, resulting in generating the "onclick" event within the context of element 111. The browser initiates an event handler, represented by a previously assigned call of function 135 shown in FIG. 9, said function: in a loop fashion, using array 130 of input parameters of the operation, using auxiliary function 132, finds template elements and forms, based on the values of the template elements, the array of input parameters of the operation; executes the operation, with transfer of input parameters; in a loop fashion, using array 131 of output parameters of the operation, using auxiliary function 132, finds template elements and initiates them by using the values of output parameters. FIG. 10 depicts visual representation 139, by the browser, of the exemplary template after initiating execution of the operation and placing the values of output parameters of the operation in corresponding template elements.

In some embodiments, for a template element, an operation call is assigned as a handler of more than one event; to this end, more than one event is also stored to the metadata of operations.

This detailed description is written using different non-limitative and non-exhaustive embodiments. As a person skilled in the art would understand, different changes, modifications and combinations of any described embodiments (fully or partially) may be effected within the scope of the present technical solution. Thus, it is intended to mean that the present description includes additional embodiments that are not explicitly set forth. Such embodiments may be obtained by way of, for example, combination, modification and transformation of any actions, components, elements, features, aspects, characteristics, limitations etc. associated with the non-limitative embodiments described herein.

The invention claimed is:

1. A method of preparing documents written in markup languages using a user interface to deal with data of an information system, the method comprising:
   forming metadata for at least one operation;
   forming a template for representing said at least one operation, the template including at least one document written in at least one markup language, the formed template including one or more template elements;
   forming and storing a link between the template and said at least one operation;
   displaying the template in a browser;
   selecting a template element of said one or more template elements, and displaying in the browser information about said at least one operation available for links forming;
   selecting said at least one operation;
   forming in the browser a link comprising an identifier for the selected template element, the template element identifier allowing a program code executed by the browser to access said selected template element, and an identifier for the selected said at least one operation and storing the formed link.

2. The method of claim 1, wherein, when forming metadata for said at least one operation, said at least one operation comprises an input or output parameter, and
   the formed template includes element for representing said input or output parameter, and
   when selecting a template element of said one or more template elements, then displaying in the browser information about said input or output parameter available for links forming, and
   selecting said input or output parameter, and
   forming in the browser a link comprising an identifier for the selected template element, the template element identifier allowing a program code executed by the browser to access said selected template element, and an identifier for the selected said input or output parameter and storing the formed link.

3. The method of claim 1, wherein the markup language is HTML, or XML, or XHTML, or DocBook.

4. The method of claim 1, wherein the template is formed using text editors with syntax highlighting, or WYSIWYG editors, or online editors.

5. The method of claim 1, wherein the formed template is stored in a database of a server.

6. The method of claim 1, wherein the information about the formed link between the template and said at least one operation is stored in a database of a server.

7. The method of claim 1, wherein, within the information about the formed link between the template and said at least one operation, an identifier of a template type and an identifier of a user language are further stored, said user language being used to form the values of auxiliary elements of the template.

8. The method of claim 5, wherein, prior to displaying the template, to retrieve the template for forming and storing links between said one or more template elements and said at least one operation, initiating the retrieving of the template in the browser such that the server, in response to a corresponding request of the browser, retrieves the template from the database and inserts, into the template, the following elements: an element comprising an identifier of said at least one operation related to the template, using information about the link between the template and said at least one operation; and an element enabling a program code library, the program code being intended to form and store links between said one or more template elements and said at least one operation.

9. The method of claim 5, wherein, prior to displaying the template, to retrieve the template for forming and storing links between said one or more template elements and said at least one operation, initiating the retrieving of the template in the browser such that the server, in response to a corresponding request of the browser, retrieves the template from the database and inserts, into the template, the following elements: an element comprising an identifier of said at least one operation related to the template, using information about the link between the template and said at least one operation; and an element comprising a program code, the code being intended to form and store links between said one or more template elements and said at least one operation.

10. The method of claim 1, wherein, for selecting the template element of said one or more template elements, when pointing a cursor onto the selected template element, the selected template element becomes graphically marked.

11. The method of claim 1, wherein the information about said at least one operation available for forming links is displayed as lists, the lists include only available operations not yet linked to any template element.

12. The method of claim 1, wherein the information about said at least one operation available for forming links is displayed in a separate browser window or in a movable area within a window displaying the template.

13. The method of claim 1, wherein the formation of links to a template element of said one or more template elements is implemented via employing a Drag-and-Drop technique.

14. The method of claim 1, wherein, after forming a link between the selected template element and said at least one operation, the selected template element becomes graphically marked.

15. The method of claim 1, wherein a sequence of child element indexes, said sequence leading to an element from a known template element of said one or more template elements, or a value of an ID attribute, or an expression for a request, the expression written in a XPath request language, or an unique value of an element is used as the identifier of the selected template element.

16. The method of claim 1, wherein, to retrieve an identifier of the selected template element, an XPath request language is used.

17. The method of claim 1, wherein the formed link between the selected template element and said at least one operation is stored in a database of a server.

* * * * *